July 1, 1947.   I. C. GARDNER   2,423,094
METHOD OF MANUFACTURING GAGES
Filed Aug. 10, 1944   2 Sheets-Sheet 1
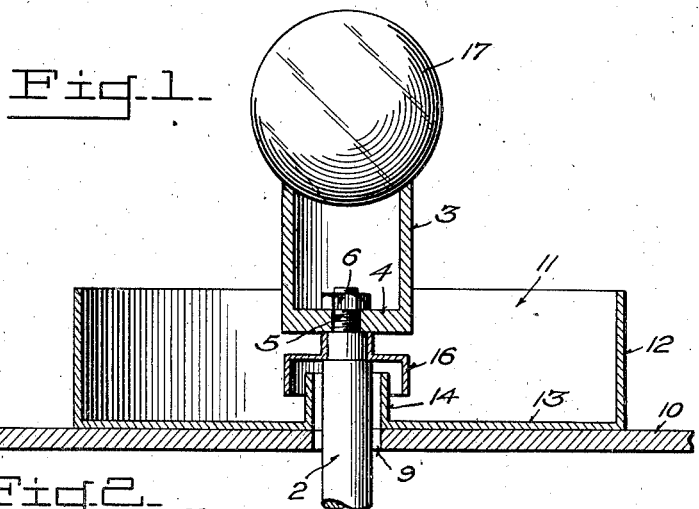
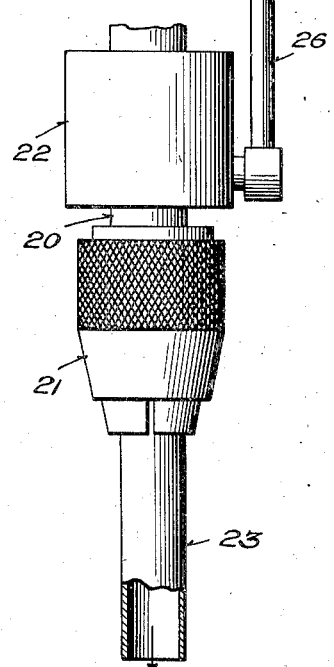
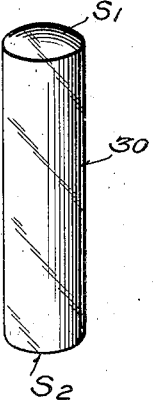
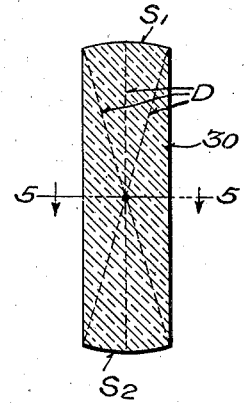
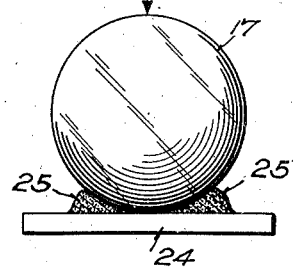
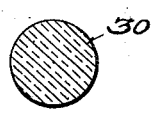
Inventor
IRVINE C. GARDNER,
By C. E. Herrstrom + H. E. Thibodeau
Attorneys July 1, 1947.   I. C. GARDNER   2,423,094
METHOD OF MANUFACTURING GAGES
Filed Aug. 10, 1944   2 Sheets-Sheet 2
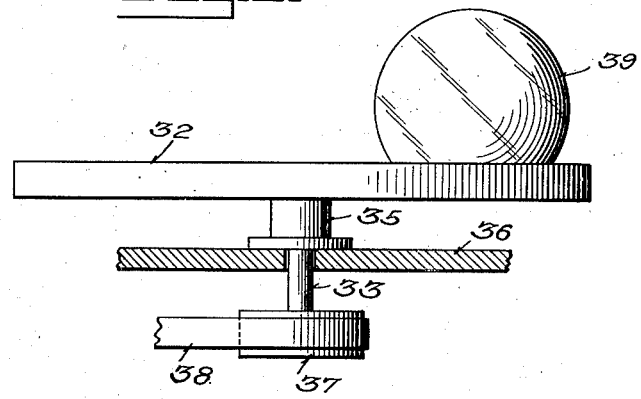
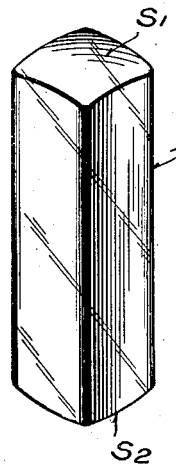 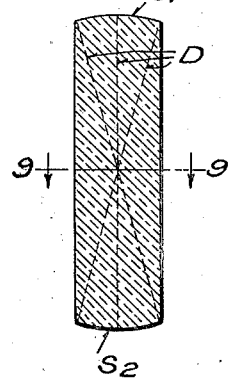 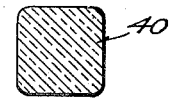
Inventor
IRVINE C. GARDNER,
By C. E. Herrstrom & W. E. Thibodeau
Attorneys Patented July 1, 1947

2,423,094

UNITED STATES PATENT OFFICE 2,423,094

METHOD OF MANUFACTURING GAGES

Irvine C. Gardner, Chevy Chase, Md.

Application August 10, 1944, Serial No. 548,877

13 Claims. (Cl. 51—286)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to method for manufacturing gages suitable for use in gaging the diameters of cylindrical holes and borings, particularly cylindrical holes and borings made in metal or metal structures by the use of machine tools.

More particularly, the invention relates to method for manufacturing gages of the kind indicated above which are formed of hard solid siliceous or vitreous material such as glass, for example a crown boro-silicate glass, fuzed silica, natural crystalline silica, and agate.

In general the method comprises isolating from a solid substantially precise sphere of the hard solid siliceous or vitreous material a columnar body of the hard solid siliceous or vitreous material while retaining at the ends of the columnar body antipodal surfaces of the sphere.

The above mentioned columnar body may be of any desired cross section, e. g., circular, square, rectangular, hexagonal, elliptical etc., and it may be uniform or non-uniform in cross section at right angles to its longitudinal axis or length.

The isolation of the columnar body from the solid sphere may be accomplished in a number of ways, among which may be mentioned cutting parallel with a diameter through the sphere with a suitable core drill or bit and grinding away, or otherwise removing, peripheral portions of the sphere to produce a columnar body while retaining antipodal surfaces of the sphere at the ends of the columnar body.

From the foregoing it will be understood that the radius of curvature of the spherical surfaces at the ends of the columnar body is the same or equal to the radius of the sphere from which the columnar body was obtained or isolated; and that the columnar body necessarily includes a diameter of the sphere at each end of which is disposed a portion of the spherical surface of the solid sphere. Thus, at each end of the columnar body is a portion of the spherical surface of the sphere, and diametrically opposite points in each of these two surfaces are spaced from each other a distance equal to the diameter of the sphere.

The invention is described in further detail in connection with the accompanying drawings, in which the same reference numeral indicates the same part or corresponding parts. In these drawings Figure 1 is a vertical central section of apparatus suitable for use in making the substantially precise sphere, showing a sphere in the course of being ground.

Figure 2 is an elevation of apparatus suitable for use in removing or isolating a diametrical core or columnar body from the sphere, and showing the sphere in position to be operated upon by the apparatus.

Figure 3 is an enlarged perspective view of the gage obtained by removing a diametrical core from the sphere by means of apparatus illustrated in Figure 2.

Figure 4 is a longitudinal central section of the gage shown in Figure 3.

Figure 5 is a cross section on the line 5—5 of Figure 4.

Figure 6 is a front elevation of apparatus suitable for use in isolating a columnar body from a sphere by grinding away peripheral portions of the sphere while retaining antipodal surfaces of the sphere on the ends of the columnar body.

Figure 7 is a perspective view of a gage made in accordance with the invention, and similar to the gage shown in Figures 3, 4 and 5 except that it is square in cross section with rounded corners.

Figure 8 is a central longitudinal section of the gage shown in Figure 7.

Figure 9 is a cross section of the gage shown in Figures 7 and 8, on the line 9—9 of Figure 8.

The sphere, from which the gage is isolated or derived, may be formed by use of the apparatus illustrated in Figure 1. The apparatus there illustrated comprises a vertical spindle 2 which carries at its upper end a tube 3 closed at its lower end by a bottom 4. The upper end of spindle 2 is provided with a threaded extension 5 which passes through an opening at the center of the bottom 4 of tube 3. A nut 6 engaging threaded extension 5 holds tube 3 on the end of spindle 2 for rotation with the latter.

Spindle 2 passes through an opening 9 in support 10 for metal pan 11, the latter having a circular vertical side wall 12 and bottom 13. A tubular neck 14 rises from the center of bottom 13 of pan 11 and registers with opening 9 in support 10. Spindle 2 passes through opening 9 and neck 14, as shown in the drawing, with sufficient clearance to permit free rotation of the spindle.

A circular apron 16, having depending circumferential portions which extend over and around the top of neck 14, is secured, as shown in the drawings, to spindle 2 between a shoulder on the spindle and the under side of bottom 4 of tube 3.

A solid glass sphere 17 is shown in the grinding position on the top of tube 3.

The outside diameter of tube 3 is about two-thirds the diameter of the finished sphere desired. Spindle 2, during the grinding of the sphere, is rotated at a rate of about 30 to 60 revolutions per minute. Tube 3 is advantageously constructed of brass and has a wall thickness of from one-eighth to one-quarter inch, the thicker wall thickness being used in connection with the grinding of larger spheres.

A block of glass, or other solid vitreous or siliceous material, is first roughed out, by chipping and rough grinding against a grinding wheel, into the general shape of a sphere, whereupon the roughed out sphere is placed upon the top of tube 3 which rotates with spindle 2. A slurry of powdered abrasive (e. g. "carborundum" or emery) and water is poured upon the rough sphere, or is spread over the rough sphere, and the sphere is then held with the hands while the tube 3 rotates, and while the sphere is so held with the hands, it is continually turned or rotated about one of its diameters in an indiscriminate or promiscuous manner, so that at one instant it is rotated about one diameter, and another instant about another diameter with no fixed pattern of movement. In this manner it is possible to obtain a substantially precise sphere in which the variations in diameters thereof are as small as one one-hundred thousandths of an inch. The grinding of the sphere is finished while using a fine abrasive in the slurry so as to produce a comparatively smooth surface on the finished sphere.

The pan 11 catches the slurry of water and powdered abrasive which flows or drops from the sphere 17 being ground; and apron 16 above neck 14 prevents slurry from falling through neck 14 through which spindle 2 passes.

A diametrical core is now isolated or removed from the sphere prepared as above described. This may be accomplished by means of the apparatus illustrated in Figure 2, in which numerals 20 and 21 respectively indicate the spindle and chuck of a drill press 22. A brass tube 23 is carried in the chuck 21. This tube cooperating with a water slurry of powdered abrasive (e. g. "carborundum") fed on the end thereof is a core bit for obtaining a diametrical core from the sphere. The sphere 17, prepared as described above, is placed on support 24 and secured in fixed position thereon by means of sealing wax 25. The sphere is positioned below tube 23 so that the longitudinal axis of the tube coincides, or approximately coincides, with the prolongation of a diameter of the sphere. By operating the hand lever 26 of the drill press, the tube 23 is advanced to and retracted from the sphere. Tube 23 is pressed down upon the sphere and a slurry of powdered abrasive and water is fed to the end of the tube making contact with the sphere. The rotating tube 23 is not held against the sphere continually during the cutting of the core therefrom, but it is lifted from and lowered thereon in more or less rapid succession. In other words, the rotating tube or bit 23 is moved up and down during the cutting or removal of the core.

Figures 3, 4 and 5 respectively illustrate a perspective view, a longitudinal section and a cross section of a core 30, constituting the gage, obtainable by the practice of the above described method or process from sphere 17 illustrated in Figures 1 and 2, the illustration, however, in Figures 3, 4 and 5 being on a larger scale than in Figures 1 and 2.

In Figure 6 is illustrated other apparatus that may be used in making gages according to the present invention. In this figure is illustrated a horizontal brass or cast iron disk 32 carried on a spindle 33 mounted in a bearing 35. Bearing 35 is supported on a support 36. A pulley 37 attached to spindle 33 is driven by belt 38, whereby the disk 32 is rotated.

A slurry of water and powdered abrasive (e. g. "carborundum") is fed upon the top of the disk, and glass spheres, made for example as above described, are held on the disk in any suitable manner. The sphere is first partly ground away as indicated by the part sphere 39, then the position of the sphere with respect to the disk is changed from time to time until a square columnar portion of the sphere having antipodal surfaces of the sphere at its ends is obtained. The corners of the columnar portion may be rounded if desired by grinding. A gage 40 obtainable in this manner is illustrated in perspective in Figure 7, in longitudinal section in Figure 8 and in cross section in Figure 9 on a somewhat larger scale of illustration than the scale employed in Figure 6.

Referring now more particularly to the gage 30 illustrated in Figures 3, 4 and 5 and to the gage 40 illustrated in Figures 7, 8 and 9, it will be seen that the lines indicated by the letter D are diameters of the spheres from which the gages were derived, that these diameters intersect at a point which was formerly the center of the spheres, and that the surfaces $S_1$ and $S_2$ at the ends of the gage are antipodal surfaces of the spheres.

I claim:

1. Method for manufacturing a gage of siliceous material for gaging cylindrical holes and borings which comprises cutting parallel with a diameter through a substantially precise sphere of siliceous material with a core bit to obtain a core which includes a diameter of the sphere and which has at each of its opposite ends a portion of the surface of the sphere.

2. Method for manufacturing a glass gage for gaging cylindrical holes and borings which comprises cutting parallel with a diameter through a substantially precise sphere of glass with a core bit to obtain a core which includes a diameter of the sphere and which has at each of its opposite ends a portion of the surface of the sphere.

3. Method for manufacturing a quartz gage for gaging cylindrical holes and borings which comprises cutting parallel with a diameter through a substantially precise sphere of quartz with a core bit to obtain a core which includes a diameter of the sphere and which has at each of its opposite ends a portion of the surface of the sphere.

4. Method for manufacturing a gage of siliceous material for gaging cylindrical holes and borings which comprises grinding a body of siliceous material into the shape of a substantially precise sphere and thereafter cutting parallel with a diameter through said sphere with a core bit to obtain a core which includes a diameter of the sphere and which has at each of its opposite ends a portion of the surface of the sphere.

5. Method for manufacturing a glass gage for gaging cylindrical holes and borings which comprises grinding a body of glass into the shape of a substantially precise sphere and thereafter cutting parallel with a diameter through said sphere with a core bit to obtain a core which includes a diameter of the sphere and which has at each of its opposite ends a portion of the surface of the sphere.

6. The method of manufacturing a gage of siliceous material suitable for use in gaging cylindrical holes and borings, which comprises grinding a body of siliceous material into the form of a substantially precise sphere, and thereafter isolating from said substantially precise sphere of siliceous material a columnar body having at its ends antipodal surfaces of said sphere.

7. The method of manufacturing a gage of glass suitable for use in gaging cylindrical holes and borings, which comprises grinding a body of glass into the form of a substantially precise sphere, and thereafter isolating from said substantially precise glass sphere a columnar body having at its ends antipodal surfaces of said sphere.

8. The method of manufacturing a gage of siliceous material suitable for use in gaging cylindrical holes and borings, which comprises forming a substantially precise sphere of siliceous material, and thereafter isolating from said sphere a columnar body having at its ends antipodal surfaces of said sphere.

9. The method of manufacturing a gage of glass suitable for use in gaging cylindrical holes and borings, which comprises forming a substantially precise sphere of glass, and thereafter isolating from said sphere a columnar body having at its ends antipodal surfaces of said sphere.

10. Method for manufacturing a gage of siliceous material for gaging cylindrical holes and borings, which comprises forming a substantially precise sphere of siliceous material, and thereafter removing peripheral portions from said sphere to form a columnar body of said siliceous material while retaining at the ends of the columnar body antipodal surfaces of the sphere.

11. Method for manufacturing a gage of glass suitable for use in gaging cylindrical holes and borings, which comprises forming a substantially precise sphere of glass, and thereafter removing peripheral portions of said sphere to form a columnar body of glass while retaining at the ends of the columnar body antipodal surfaces of the sphere.

12. Method for manufacturing a gage of siliceous material suitable for use in gaging cylindrical holes and borings, which comprises grinding a body of siliceous material into the form of a substantially precise sphere, and thereafter grinding away portions of said sphere to form a columnar body of siliceous material while retaining at the ends of the columnar body antipodal surfaces of the sphere.

13. Method for manufacturing a gage of glass suitable for use in gaging cylindrical holes and borings, which comprises grinding a body of glass into the form of a substantially precise sphere, and thereafter grinding away portions of said sphere to form a columnar body of glass while retaining at the ends of the columnar body antipodal surfaces of the sphere.

IRVINE C. GARDNER.

REFERENCES CITED

The following references are of record in the file of this patent:

UNITED STATES PATENTS

| Number | Name | Date |
| --- | --- | --- |
| 1,170,255 | Hess | Feb. 1, 1916 |
| 1,225,315 | Conrad | May 8, 1917 |
| 1,793,763 | Tornebohn | Feb. 24, 1931 |
| 1,784,463 | Nice | Dec. 9, 1930 |

FOREIGN PATENTS

| Number | Country | Date |
| --- | --- | --- |
| 279,491 | Great Britain | Oct. 21, 1927 |